United States Patent
Liu et al.

(10) Patent No.: US 9,659,692 B2
(45) Date of Patent: May 23, 2017

(54) PREPARATION METHOD AND APPLICATION OF MAGNETIC IRON OXIDE AND DESULFURIZER CONTAINING THE MAGNETIC IRON OXIDE AS ACTIVE COMPONENT

(75) Inventors: Zhenyi Liu, Beijing (CN); Wenjun Mao, Beijing (CN); Fengren Liu, Beijing (CN)

(73) Assignee: BEIJING SJ ENVIRONMENTAL PROTECTION AND NEW MATERIAL CO., LTD., Beijing (CN)

( * ) Notice: Subject to any disclaimer, the term of this patent is extended or adjusted under 35 U.S.C. 154(b) by 494 days.

(21) Appl. No.: 14/131,164

(22) PCT Filed: May 21, 2012

(86) PCT No.: PCT/CN2012/075831
§ 371 (c)(1),
(2), (4) Date: Jan. 6, 2014

(87) PCT Pub. No.: WO2013/097404
PCT Pub. Date: Jul. 4, 2013

(65) Prior Publication Data
US 2014/0124697 A1  May 8, 2014

(30) Foreign Application Priority Data

Dec. 29, 2011 (CN) .......................... 2011 1 0450769

(51) Int. Cl.
| | |
|---|---|
| *B01D 53/48* | (2006.01) |
| *H01F 1/01* | (2006.01) |
| *B01J 23/745* | (2006.01) |
| *C01G 49/02* | (2006.01) |
| *B01D 53/02* | (2006.01) |

(Continued)

(52) U.S. Cl.
CPC .............. *H01F 1/01* (2013.01); *B01D 53/02* (2013.01); *B01D 53/52* (2013.01); *B01J 23/745* (2013.01);
(Continued)

(58) Field of Classification Search
None
See application file for complete search history.

(56) References Cited

U.S. PATENT DOCUMENTS

2008/0241055 A1   10/2008   Kawase et al.

FOREIGN PATENT DOCUMENTS

| | | |
|---|---|---|
| CN | 101126115 A | 2/2008 |
| CN | 101274781 A | 10/2008 |

(Continued)

OTHER PUBLICATIONS

Canadian Office Action dated Feb. 25, 2015 issued in corresponding Canada Patent Application No. 2,840,104.
(Continued)

*Primary Examiner* — Jennifer A Smith
*Assistant Examiner* — Anita Nassiri Motlagh
(74) *Attorney, Agent, or Firm* — Birch, Stewart, Kolasch & Birch, LLP

(57) ABSTRACT

A method of preparing magnetic iron oxide $Fe_{21.333}O_{32}$, which includes the steps of preparing a solid green rust and calcining the solid green rust to obtain the magnetic iron oxide $Fe_{21.333}O_{32}$. Also provided is the application of magnetic iron oxide $Fe_{21.333}O_{32}$ as an active material in desulfurization at a medium temperature. Also provided is a desulfurizer which uses magnetic iron oxide $Fe_{21.333}O_{32}$ and the application thereof. The present preparation method has simple steps and a short production period.

19 Claims, 1 Drawing Sheet

(51) Int. Cl.
*B01D 53/52* (2006.01)
*B01J 37/03* (2006.01)
*B01J 37/08* (2006.01)
*B01J 35/00* (2006.01)

(52) U.S. Cl.
CPC ........... *B01J 35/002* (2013.01); *B01J 37/031* (2013.01); *B01J 37/08* (2013.01); *C01G 49/02* (2013.01); *B01D 2253/1124* (2013.01); *B01D 2255/20738* (2013.01); *B01D 2257/304* (2013.01); *C01P 2002/72* (2013.01)

(56) References Cited

FOREIGN PATENT DOCUMENTS

| CN | 101585557 A | 11/2009 |
| CN | 101590358 A | 12/2009 |
| CN | 102039086 A | 5/2011 |

OTHER PUBLICATIONS

First Office Action dated May 5, 2014 issued in corresponding Japanese Patent Application No. 201110450769.X (with English translation).

International Preliminary Report on Patentability, Written Opinion of the International Searching Authority dated Jul. 1, 2014 in corresponding application No. PCT/CN2012/075831.

Second Office Action dated Dec. 31, 2014 issued in correspondinrg Japanese Patent Application No. 201110450769.X (with English translation).

Office Action issued in corresponding Canadian Application No. 2,840,104 on Nov. 6, 2015.

Office Action issued in corresponding China Application No. 201110450769.X on Jun. 30, 2015 (with English translation).

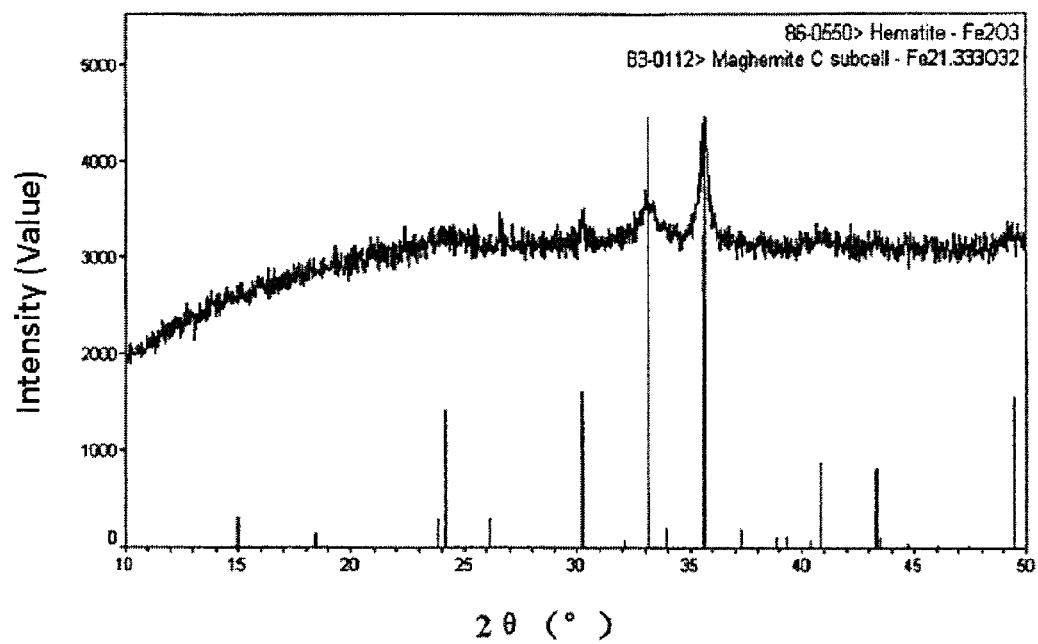

PREPARATION METHOD AND APPLICATION OF MAGNETIC IRON OXIDE AND DESULFURIZER CONTAINING THE MAGNETIC IRON OXIDE AS ACTIVE COMPONENT

FIELD OF THE INVENTION

This invention refers to preparation method and application of magnetic iron oxide $Fe_{21.333}O_{32}$ and desulfurizer containing the same as active component. More particularly, this invention refers to preparation method of magnetic iron oxide $Fe_{21.333}O_{32}$ with simple steps and short production time, and desulfurizer containing the same as active component.

DESCRIPTION OF THE RELATED ART

Sulphides such as hydrogen sulphide are produced in many industrial occasions, and these sulphides will cause environmental pollutions if being discharged without any treatment, and may also deactivate the active component of a catalyst in subsequent production sections. In order to reduce the damage caused by the above sulphides on environmental as well as industrial production, desulfurizer plays an important role.

Iron based desulfurizer is one of the conventional desulfurizers. Chinese patent document CN101585557A discloses a method of producing magnetic iron oxide $Fe_{21.333}O_{32}$ and magnetic iron oxide desulfurizer produced thereby, comprising mixing and kneading a solid soluble ferrous salt with a solid hydroxide at a temperature less than 70° C. to yield a first mixture, drying the first mixture in air to yield a second mixture, washing the second mixture with water and filtering it to yield a third mixture, then drying the third mixture naturally or roasting the third mixture to yield non-crystalline iron oxide hydroxide, and finally calcining the iron oxide hydroxide at a temperature in the range of 150° C.~500° C. for 0.5~3 hours, thus obtaining a magnetic iron oxide $Fe_{21.333}O_{32}$ with a sulfur capacity as high as 62%. In this patent document, after kneading a solid soluble ferrous salt with a solid hydroxide, the obtained product has to be dried in air, washed with water, filtered and roasted to yield non-crystalline iron oxide hydroxide FeOOH, and the non-crystalline iron oxide hydroxide has to be further calcined so as to obtain magnetic iron oxide $Fe_{21.333}O_{32}$. Therefore, the method disclosed in this patent document comprises so many steps and need a long production time; Furthermore, this patent document only teaches that the magnetic iron oxide $Fe_{21.333}O_{32}$ has a good desulfurization activity under a normal temperature and pressure, but does not give any information on medium temperature desulfurization.

As discussed above, although the prior art disclosed a method of producing magnetic iron oxide $Fe_{21.333}O_{32}$, this method comprises so many steps and need a long production time, accordingly it needs to be further improved. Moreover, the prior art does not disclose desulfurization activity of magnetic iron oxide $Fe_{21.333}O_{32}$ at medium temperature.

SUMMARY OF THE INVENTION

In view of the above-described problems, since the method of producing magnetic iron oxide $Fe_{21.333}O_{32}$ in the prior art needs many steps and a long production time, the technical problem underlying the present invention is to provide a preparation method of magnetic iron oxide $Fe_{21.333}O_{32}$ with simple steps and short production time.

The present invention also provides an application of magnetic iron oxide $Fe_{21.333}O_{32}$ as desulfurizer functional materials for desulfurization at medium temperature (≤400° C.), and provides a desulfurizer containing the magnetic iron oxide $Fe_{21.333}O_{32}$ obtained according to the present invention as active component. The desulfurizer comprising an organic binder is suitable to be used in desulfurization at normal temperature, while the desulfurizer comprising an inorganic binder is suitable to be used in desulfurization at both normal and medium temperature.

In order to solve the above-described technical problems, the present invention provides a preparation method of magnetic iron oxide $Fe_{21.333}O_{32}$, comprising the following steps: preparing a solid green rust, and then calcining said solid green rust to obtain a magnetic iron oxide $Fe_{21.333}O_{32}$.

Said solid green rust is obtained from mixing and reacting a solid ferrous salt with a solid alkaline substance, or mixing and reacting a solution of ferrous salt with a solid alkaline substance, or mixing and reacting a solution of ferrous salt with a solution of alkaline substance.

Said alkaline substance is hydroxide or carbonate.

The molar ratio of said ferrous salt to said hydroxide is (1:2.08)~(1:2.22). Since a large amount of heat will be released when dissolving hydroxide in water or kneading hydroxide with ferrous salt, the temperature is controlled not exceeding 70° C.

The molar ratio of said ferrous salt to said carbonate is (1:1.04)~(1:1.1).

Said calcining is carried out at a temperature of 250° C.~400° C., preferably 300° C.~350° C.

Said calcining lasts for 1-3 hours, preferably for 1.5-2 hours.

The present invention also provides an application of magnetic iron oxide $Fe_{21.333}O_{32}$ obtained according to the preparation method described above as active materials of desulfurization at medium temperature.

The present invention also provides a desulfurizer, comprising magnetic iron oxide $Fe_{21.333}O_{32}$ and a binder, wherein said magnetic iron oxide $Fe_{21.333}O_{32}$ is prepared according to the preparation method described above.

Said magnetic iron oxide $Fe_{21.333}O_{32}$ constitutes 87-92 weight % of the desulfurizer, and said binder constitutes 8-13 weight % by of the desulfurizer.

Said binder is an organic binder.

The desulfurizer further comprises a dispersing agent.

Said magnetic iron oxide $Fe_{21.333}O_{32}$ constitutes 87-92 weight % of the desulfurizer, said binder constitutes 3-5 weight % of the desulfurizer, and said dispersing agent constitutes 4-8 weight % of the desulfurizer.

Said dispersing agent is selected from the group consisting of active carbon powder, apricot stone carbon, coconut shell carbon, willow carbon powder, wooden carbon and coaly carbon and any combination thereof.

Said binder is an inorganic binder.

Said inorganic binder is selected from the group consisting of bentonite, kaolin clay, attapulgite and Yang Gan soil and any combination thereof.

The present invention also provides an application of said desulfurizer as a desulfurizer at medium temperature.

The chemical composition and structure of green rust (Green Rust, referred to GR) has been confirmed already.

GR1:$[Fe^{II}_4.Fe^{III}_2(OH)_{12}].[CO_3.2H_2O]$, a=3.16 Å, c=22.45 Å

GR2:$[Fe^{II}_4.Fe^{III}_2(OH)_{12}].[SO_4.2H_2O]$, a=3.17 Å, c=10.90 Å

Compared with the prior art, the advantages offered by the technical solution of the present invention are summarized as follows:

(1) The preparation method of the present invention, in which green rust is used as raw materials and is calcined in one step to obtain magnetic iron oxide $Fe_{21.333}O_{32}$, allows simple steps and short production period, particularly suitable to be used in mass industrial production.

(2) In the present invention, green rust can be simply obtained by reacting a solid ferrous salt with a solid alkaline substance, or by reacting a solution of ferrous salt with a solid alkaline substance, or by reacting a solution of ferrous salt with a solution of alkaline substance.

(3) It provides a suitable molar ratio for the generation of green rust through controlling the molar ratio of ferrous salt to hydroxide in a range from 1:2.08 to 1:2.22 and the molar ratio of ferrous salt to carbonate in the range from 1:1.04 to 1:1.1, not only allowing reactants to react and form green rust to the maximum, but also avoiding generation of some other iron oxides caused by an excess of ferrous iron or alkali.

(4) In the present invention, solid green rust is calcined to obtain magnetic iron oxide $Fe_{21.333}O_{32}$ directly. Green rust can react and form magnetic iron oxide $Fe_{21.333}O_{32}$ through controlling the calcination temperature at 250° C.~400° C., preferably iat 300° C.~350° C., whereby the obtained magnetic iron oxide from calcination has a pure phase, a high magnetic property and a good desulfurization activity. It can guarantee a complete transformation of green rust through controlling the proceeding time of calcination for 1-3 hours, preferably 1.5-2 hours, thus reducing the production time, further reducing the production period and increasing the efficiency.

(5) The magnetic iron oxide $Fe_{21.333}O_{32}$ obtained according to the present invention has a good desulfurization activity which is especially better at normal and medium temperatures (less than or equal to 400° C.), with a sulfur capacity of 60% at normal and medium temperatures. A desulfurizer, prepared by using said magnetic iron oxide $Fe_{21.333}O_{32}$ as desulfurization active component and mixing it with an organic binder and a dispersing agent, has a good desulfurization activity at normal temperatures, with a sulfur capacity of 52%. A further desulfurizer, prepared by using said magnetic iron oxide $Fe_{21.333}O_{32}$ as desulfurization active component and mixing it with an inorganic binder, also has a good desulfurization activity at normal and medium temperatures, with a sulfur capacity of 52% at normal temperatures and a sulfur capacity of 55% at medium temperatures.

BRIEF DESCRIPTION OF THE DRAWINGS

The content of the present invention will now be described in detail with reference to certain Examples and the FIGURE which are given herein below by way of illustration only, and thus are not limitative of the present invention, and wherein, The FIGURE is an XRD pattern of the magnetic iron oxide $Fe_{21.333}O_{32}$ prepared according to method of the present invention.

DETAILED EMBODIMENTS OF THIS INVENTION

Example 1

632 g powder of $FeSO_4.7H_2O$ with a content of 88 wt. % and 185 g NaOH micro-particles with a content of 96 wt. % were mixed uniformly, and then were put in a kneader for kneading, wherein the molar ratio of iron to hydroxyl was 1:2.22, and the reaction temperature was controlled at 70° C., producing a reaction mixture. After the color of the reaction mixture turned dark green, the reaction mixture was washed thrice with water, obtaining a filter cake of green rust.

Said filter cake of green rust was calcined at 300° C. for 2 hours, producing magnetic iron oxide $Fe_{21.333}O_{32}$.

87 g said magnetic iron oxide $Fe_{21.333}O_{32}$ was used as active component for a desulfurizer, and was mixed uniformly with 5 g sesbania powder and 8 g active carbon powder, yielding a mixture which then was rolled in a sugar-coating machine to yield small balls with a diameter of 5 mm. Said small balls were roasted to produce a ball-like desulfurizer named as desulfurizer A, wherein the magnetic iron oxide $Fe_{21.333}O_{32}$, binder and dispersing agent constitute 87 wt. %, 5 wt. % and 8 wt. % of the desulfurizer A respectively.

Example 2

632 g $FeSO_4.7H_2O$ with a content of 88 wt. % was prepared into an aqueous solution and was put in a reactor, and then 234 g solid $Na_2CO_3$ was added into the reactor under stirring. Wherein, the molar ratio of iron to carbonate ion was 1:1.05. After reaction, a suspension of green rust was produced. Said suspension of green rust was filtered to yield a solid, and said solid was washed thrice with water, obtaining a filter cake of green rust.

Said green rust filter cake was calcined at 350° C. for 1.5 hours, producing magnetic iron oxide $Fe_{21.333}O_{32}$.

135 g said magnetic iron oxide $Fe_{21.333}O_{32}$ was used as active component for a desulfurizer, and was mixed uniformly with 4.5 g cellulose powder and 10.5 g mixtures of apricot stone carbon powder, coconut shell carbon powder and willow carbon powder, yielding a mixture which then was rolled in a small sugar-coating machine to yield small balls with a diameter of 4 mm. Said small balls were roasted to produce a ball-like desulfurizer named as desulfurizer B, wherein the magnetic iron oxide $Fe_{21.333}O_{32}$, binder and dispersing agent constitute 90 wt. %, 3 wt. % and 7 wt. % of the desulfurizer B respectively.

Example 3

254 g anhydrous $FeCl_2$ was prepared into an aqueous solution and was put in a reactor, and then 222.6 g anhydrous $Na_2CO_3$ was added into the reactor under stirring. Wherein, the molar ratio of iron to carbonate ion was 1:1.04. After reaction, a suspension of green rust was produced. Said suspension of green rust was filtered to yield a solid, and said solid was washed thrice with water, obtaining a filter cake of green rust.

Said filter cake of green rust was calcined at 250° C. for 3 hours, producing magnetic iron oxide $Fe_{21.333}O_{32}$.

110.4 g said magnetic iron oxide $Fe_{21.333}O_{32}$ was used as active component for a desulfurizer, and was mixed uniformly with 4.8 g sodium carboxymethyl cellulose and 4.8 g wooden carbon powder, yielding a mixture which then was rolled in a small sugar-coating machine to yield small balls with a diameter of 5 mm. Said small balls were roasted to produce a ball-like desulfurizer named as desulfurizer C, wherein the magnetic iron oxide $Fe_{21.333}O_{32}$, binder and dispersing agent constitute 92 wt. %, 4 wt. % and 4 wt. % of the desulfurizer C respectively.

Example 4

254 g anhydrous $FeCl_2$ was prepared into an aqueous solution and was put in a reactor, and 175 g solid NaOH with a content of 96 wt. % was prepared into an aqueous solution and was also put into the reactor under stirring. Wherein, the molar ratio of iron to hydroxyl was 1:2.08, and the reaction temperature was controlled at 50° C. After reaction, a suspension of green rust was produced. Filtering said suspension of green rust to yield a solid. Said solid was washed thrice with water, obtaining a filter cake of green rust.

Said filter cake of green rust was calcined at 400° C. for 2 hours, producing magnetic iron oxide $Fe_{21.333}O_{32}$.

162 g said magnetic iron oxide $Fe_{21.333}O_{32}$ was used as active component for a desulfurizer, and was mixed uniformly with 10.8 g coaly carbon powder and 7.2 g binder consisting of sesbania powder and cellulose powder, yielding a mixture which then was rolled in a small sugar-coating machine to yield small balls with a diameter of 5 mm. Said small balls were further roasted to produce a ball-like desulfurizer named as desulfurizer D, wherein the magnetic iron oxide $Fe_{21.333}O_{32}$, binder and dispersing agent constitute 90 wt. %, 4 wt. % and 6 wt. % of the desulfurizer D respectively.

Example 5

254 g anhydrous $FeCl_2$ powder was mixed uniformly with 222.6 g anhydrous $Na_2CO_3$ micro-particles, and the mixture was kneaded in a kneader, wherein the molar ratio of iron to carbonate ion was 1:1.04. After the color of the reaction mixture turned dark green, the reaction mixture was washed thrice with water, obtaining a filter cake of green rust.

Said filter cake of green rust was calcined at 400° C. for 1 hour, producing magnetic iron oxide $Fe_{21.333}O_{32}$.

162 g said magnetic iron oxide $Fe_{21.333}O_{32}$ was used as active component for a desulfurizer, and was mixed uniformly with 10.8 g bentonite as a binder, and then the mixture was rolled in a small sugar-coating machine to yield small balls with a diameter of 5 mm. Said small balls were further roasted to produce a ball-like desulfurizer named as desulfurizer E, wherein the magnetic iron oxide $Fe_{21.333}O_{32}$ and binder constitute 90 wt. % and 10 wt. % of the desulfurizer E respectively.

Example 6

632 g $FeSO_4 \cdot 7H_2O$ with a content of 88 wt. % was prepared into an aqueous solution and was put in a reactor, and then 175 g NaOH with a content of 96 wt. % was added into the reactor under stirring, wherein the molar ratio of iron to hydroxyl was 1:2.1, and the reaction temperature was controlled at 45° C. After reaction, a suspension of green rust was produced. Said suspension of green rust was filtered to yield a solid. Said solid was washed thrice with water, obtaining a filter cake of green rust.

Said filter cake of green rust was calcined at 250° C. for 3 hours, producing magnetic iron oxide $Fe_{21.333}O_{32}$.

104.5 g said magnetic iron oxide $Fe_{21.333}O_{32}$ was used as active component for a desulfurizer, and was mixed uniformly with 15.5 g attapulgite, and then the mixture was rolled in a small sugar-coating machine to yield small balls with a diameter of 5 mm. Said small balls were further roasted to produce a ball-like desulfurizer named as desulfurizer F, wherein the magnetic iron oxide $Fe_{21.333}O_{32}$ and binder constitute 87 wt. % and 13 wt. % of the desulfurizer F respectively.

Example 7

632 g $FeSO_4 \cdot 7H_2O$ with a content of 88 wt. % was prepared into an aqueous solution and was put in a reactor, and then 185 g solid NaOH with a content of 96 wt. % was added into the reactor under stirring, wherein the molar ratio of iron to hydroxyl was 1:2.22, and the reaction temperature was controlled at 55° C. After reaction, a suspension of green rust was produced. Said suspension of green rust was filtered to yield a solid. Said solid was washed thrice with water, obtaining a filter cake of green rust.

Said filter cake of green rust was calcined at 350° C. for 1.5 hours, producing magnetic iron oxide $Fe_{21.333}O_{32}$.

92 g said magnetic iron oxide $Fe_{21.333}O_{32}$ was used as active component for a desulfurizer, and was mixed uniformly with 8 g kaolin clay, and then the mixture was rolled in a small sugar-coating machine to yield small balls with a diameter of 5 mm. Said small balls were further roasted to produce a ball-like desulfurizer named as desulfurizer G, wherein the magnetic iron oxide $Fe_{21.333}O_{32}$ and binder constitute 92 wt. % and 8 wt. % of desulfurizer G respectively.

Example 8

254 g anhydrous $FeCl_2$ was prepared into an aqueous solution and was put in a reactor. 235 g anhydrous $Na_2CO_3$ was prepared into an aqueous solution and was added into the reactor under stirring. Wherein, the molar ratio of iron to carbonate ion was 1:1.1. After reaction, a suspension of green rust was produced. Said suspension of green rust was filtered to yield a solid. Said solid was washed thrice with water, obtaining a filter cake of green rust.

Said filter cake of green rust was calcined at 300° C. for 2.5 hours, producing magnetic iron oxide $Fe_{21.333}O_{32}$.

109.2 g said magnetic iron oxide $Fe_{21.333}O_{32}$ was used as active component for a desulfurizer, and was mixed uniformly with 10.8 g kaolin clay, and then the mixture was rolled in a small sugar-coating machine to yield small balls with a diameter of 5 mm. Said small balls were further roasted to produce a ball-like desulfurizer named as desulfurizer H, wherein the magnetic iron oxide $Fe_{21.333}O_{32}$ and binder constitute 91 wt. % and 9 wt. % of desulfurizer H respectively.

In the above mentioned examples, the active carbon powder, apricot stone carbon, coconut shell carbon, willow carbon powder, wooden carbon and coaly carbon are commercially available.

Desulfurization Performance Test

The evaluation conditions for sulfur capacity are as follows: The sulfur capacity was measured at normal pressures (environmental pressure, normally one atmospheric pressure) by using $N_2$ as background gas and by using a standard gas containing 40,000 ppm $H_2S$. The desulfurization exhaust gas was detected using 0.1 mol/L $AgNO_3$ solution. When black precipitates appear in the $AgNO_3$ solution, the volume of the consumed standard gas was calculated, and the breakthrough sulfur capacity was further calculated. $H_2S$ was detected using WL-94 trace sulfur analyzer (Chromatography), which had a minimal measurement of 0.02 ppm.

Desulfurization Performance Test 1

The desulfurization activity at normal temperatures (i.e. environmental temperatures, normally between −5° C. and 45° C.) of the magnetic iron oxides $Fe_{21.333}O_{32}$ and desulfurizers obtained in the above mentioned eight examples were measured according to the above sulfur capacity evaluation conditions, and the results are shown in table 1:

TABLE 1

The desulfurization activities of magnetic iron oxides $Fe_{21.333}O_{32}$ obtained at different calcination temperatures and desulfurizers thereof.

|  | Example 1 | Example 2 | Example 3 | Example 4 | Example 5 | Example 6 | Example 7 | Example 8 |
|---|---|---|---|---|---|---|---|---|
| Sulfur capacity of $Fe_{21.333}O_{32}$ | 59% | 58% | 57% | 54% | 55% | 56% | 59% | 60% |
| Sulfur capacity of desulfurizers | 50.3% | 52.0% | 51.8% | 48.9% | 48.6% | 50.5% | 51.4% | 52% |

From the above test results it can be seen that, when used at normal temperatures and pressures, the magnetic iron oxides $Fe_{21.333}O_{32}$ obtained by calcining green rust at 250° C.~400° C. and the desulfurizers containing the same as active component have relatively high desulfurization activity.

Desulfurization Performance Test 2

The desulfurization activity at medium temperatures (250° C., 300° C., 350° C., 400° C.) of the magnetic iron oxides $Fe_{21.333}O_{32}$ and desulfurizers obtained in the above mentioned eight examples were measured according to the above sulfur capacity evaluation conditions. The desulfurization activity results of the magnetic iron oxides $Fe_{21.333}O_{32}$ in each example at desulfurization temperatures of 250° C., 300° C., 350° C., 400° C. were shown in Table 2. The desulfurization activity results of the desulfurizers in examples 5-8 at desulfurization temperatures of 250° C., 300° C., 350° C., 400° C. were shown in table 3.

TABLE 2

The desulfurization activity of magnetic iron oxide $Fe_{21.333}O_{32}$ at medium temperatures

|  | Example 1 | Example 2 | Example 3 | Example 4 | Example 5 | Example 6 | Example 7 | Example 8 |
|---|---|---|---|---|---|---|---|---|
| desulfurization temperatures (° C.) | 300 | 350 | 250 | 400 | 400 | 250 | 350 | 300 |
| Sulfur capacity of $Fe_{21.333}O_{32}$ | 46% | 60% | 40% | 56% | 57% | 42% | 59% | 46% |

From the above test results it can be seen that, when used at medium temperatures (250° C.~400° C.), the magnetic iron oxides $Fe_{21.333}O_{32}$ obtained in the above examples in the present invention have relatively high desulfurization activity.

TABLE 3

The desulfurization activity of the desulfurizers in examples 5-8 at medium temperatures

| Sulfur capacity | Desulfurization temperatures | | | |
|---|---|---|---|---|
| of desulfurizers | 250° C. | 300° C. | 350° C. | 400° C. |
| Desulfurizer E | 37.5% | 41.6% | 52.8% | 50.1% |
| Desulfurizer F | 36.2% | 39.1% | 51.8% | 48.2% |
| Desulfurizer G | 39.4% | 41.4% | 53.1% | 50.4% |
| Desulfurizer B | 38.4% | 40.5% | 55.0% | 51.2% |

From the above test results it can be seen that, the desulfurizers obtained in the above examples in the present invention containing the magnetic iron oxides $Fe_{21.333}O_{32}$ as active component have relatively high desulfurization activity at temperatures of 250° C.~400° C.

It should be noted that, as long as the desulfurizer of the present invention comprises magnetic iron oxide $Fe_{21.333}O_{32}$ prepared by the method of the present invention, the desulfurizer will realize the purpose of desulfurization at normal and medium temperatures, therefore desulfurizers comprising said magnetic iron oxide $Fe_{21.333}O_{32}$ are all within the scope of the present invention. Furthermore, in the preparation method of said magnetic iron oxide $Fe_{21.333}O_{32}$, the soluble ferrous salts, alkali and carbonates are not limited to these disclosed in the above mentioned examples and further comprise other soluble ferrous salt, alkali and carbonates, such as $FeSO_4 \cdot 7H_2O$, $FeCl_2 \cdot 4H_2O$, and $Fe(NO_3)_2 \cdot 6H_2O$ etc.

Above particular embodiments of the invention have been shown and described for description rather than limitation. It will be obvious to those skilled in the art that changes and modifications may be made without departing from the invention in its broader aspects, and, therefore, all such changes and modifications fall within the true spirit and scope of the invention.

The invention claimed is:

1. A method of preparing magnetic iron oxide $Fe_{21.333}O_{32}$, which comprises preparing a solid green rust, and then calcining the solid green rust to obtain the magnetic iron oxide $Fe_{21.333}O_{32}$.

2. The method of claim 1, wherein, the solid green rust is obtained by mixing and reacting a solid ferrous salt with a solid alkaline substance, or mixing and reacting a solution of ferrous salt with a solid alkaline substance, or mixing and reacting a solution of ferrous salt with a solution of an alkaline substance.

3. The method of claim 2, wherein, said alkaline substance is a hydroxide or a carbonate.

4. The method of claim 3, wherein, the molar ratio of the ferrous salt to the hydroxide is (1:2.08) ~(1:2.22).

5. The method of claim 3, wherein, the molar ratio of the ferrous salt to said carbonate is (1:1.04) ~(1:1.1).

6. The method of claim 1, wherein, the calcining is carried out at a temperature of 250° C. ~400° C.

7. The method of claim 1, wherein, the calcining is carried out at a temperature of 300° C~350° C.

8. The method of claim 1, wherein, the calcining lasts for 1-3 hours.

9. The method of claim 1, wherein, the calcining lasts for 1.5-2 hours.

10. The application of magnetic iron oxide $Fe_{21.333}O_{32}$ obtained according to the method of claim 1 as an active material of desulfurization at a medium temperature of 250° C. to 400° C.

11. A desulfurizer, comprising magnetic iron oxide $Fe_{21.333}O_{32}$ and a binder, wherein said magnetic iron oxide $Fe_{21.333}O_{32}$ is prepared according to the preparation method of claim 1.

12. The desulfurizer of claim 11, wherein, said magnetic iron oxide $Fe_{21.333}O_{32}$ constitutes 87-92 weight % of the desulfurizer, and said binder constitutes 8-13 weight % of the desulfurizer.

13. The desulfurizer of claim 11, wherein, said binder is an organic binder.

14. The desulfurizer of claim 13, wherein, further comprising a dispersing agent.

15. The desulfurizer of claim 14, wherein, said magnetic iron oxide $Fe_{21.333}O_{32}$ constitutes 87-92 weight % of the desulfurizer, and said binder constitutes 3-5 weight % of the desulfurizer, and said dispersing agent constitutes 4-8 weight % of the desulfurizer.

16. The desulfurizer of claim 14, wherein, said dispersing agent is selected from the group consisting of active carbon powder, apricot stone carbon, coconut shell carbon, willow carbon powder, wooden carbon and coaly carbon and any combination thereof.

17. The desulfurizer of claim 11, wherein, said binder is an inorganic binder.

18. The desulfurizer of claim 12, wherein, said binder is an inorganic binder.

19. The desulfurizer of claim 17, wherein, said inorganic binder is selected from the group consisting of bentonite, kaolin clay, attapulgite and Yang Gan soil and any combination thereof.

* * * * *